UNITED STATES PATENT OFFICE.

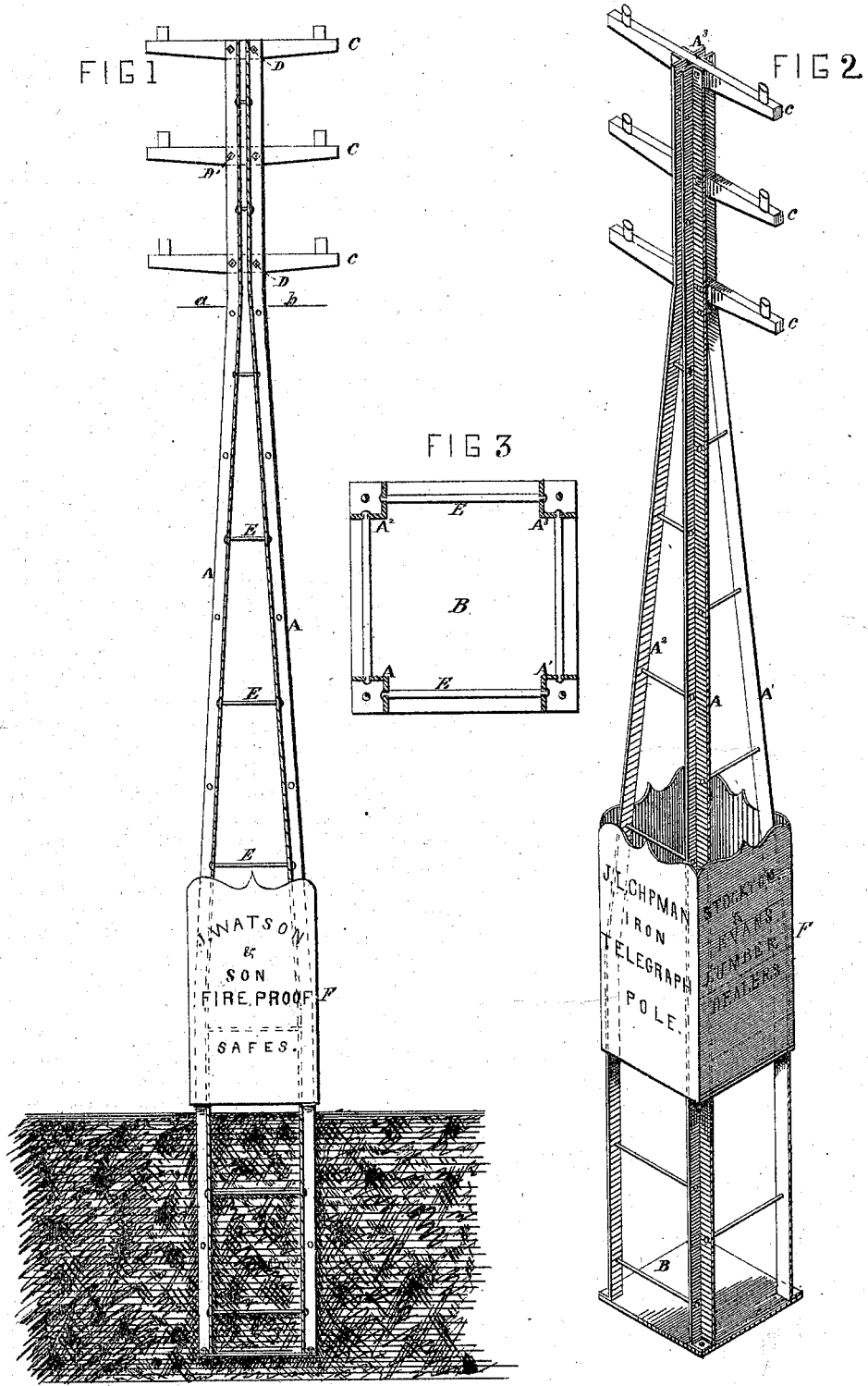

JOSEPH L. CHAPMAN, OF PHILADELPHIA, PENNSYLVANIA, ASSIGNOR OF TWO-THIRDS HIS RIGHT TO JOHN C. STOCKTON AND JAMES WATSON, OF SAME PLACE.

IMPROVEMENT IN TELEGRAPH-POLES.

Specification forming part of Letters Patent No. 142,082, dated August 26, 1873; application filed March 1, 1873.

*To all whom it may concern:*

Be it known that I, JOSEPH L. CHAPMAN, of the city and county of Philadelphia and State of Pennsylvania, have invented certain Improvements in Telegraph-Poles, of which the following is a specification:

My invention consists of four bars of light angle-iron, furnished at their lower ends with flanged feet for securing them to a suitable base-plate, connected by tie-rods, and placed partially in a vertical and inclined position, and grouped together at the upper portion to receive the wooden cross-pieces which support the insulators and wires.

Figure 1 is an elevation of my invention, showing it properly erected. Fig. 2 is a perspective view of the same, showing the exact form of the structure. Fig. 3 is a cross-section of the same.

The structure shown in the drawing consists of four bars or strips of rolled angle-iron, A, $A^1$, $A^2$, and $A^3$, placed in a vertical position, and of sufficient length for embedding in the earth and to form the proper height for a telegraph-pole. The lower ends of these bars are provided with feet or lugs, which are secured to a base-plate, B, of adequate area to form a broad and steady base. The upper portion of the bars above the ground surface are inclined inward, and approach, on the line $a\ b$, Fig. 1, to within a short distance of each other, and from the line $a\ b$ to the top they extend straight and parallel. The cross-bars C C C for supporting the wires are inserted between the bars A, $A^1$, $A^2$, and $A^3$, and secured in place by means of bolts D D D, as shown in the drawing. To increase the strength and stiffness of the structure, the bars A $A^1$ $A^2$ $A^3$ are tied and braced by means of bolts E E, &c., which are provided with shoulders and riveted to the sides of the bars. The said bolts, on one side of the structure, may be placed close together, so as to answer the purpose of a ladder for a person to ascend when the wires require adjustment. The lower portion of the structure is embedded in the ground, as shown in Fig. 1, and the earth packed solidly in and around it. A casing, F, of wood or iron, is placed around it above the surface of the ground, which answers the purpose of a guard to prevent unauthorized persons ascending the structure. If desired, this casing may be dispensed with, and a letter or fire-alarm box substituted.

In ascending the structure, a short ladder is used, which enables a person to pass the casing or obstruction F.

What I claim as my invention is—

The combination, in a telegraph-pole, of the four bars of angle-iron A A A A, provided with flanged feet at the lower ends for securing them to the base-plate B, connected by rods E E, and arranged at the upper portion to receive the cross-pieces C C C, substantially as herein shown and described.

JOSEPH L. CHAPMAN.

Witnesses:
   ISAAC R. OAKFORD,
   ISAAC TOWNSEND.